(12) United States Patent
Robert

(10) Patent No.: US 10,462,450 B2
(45) Date of Patent: Oct. 29, 2019

(54) COMBINING TWO-DIMENSIONAL IMAGES WITH DEPTH DATA TO DETECT JUNCTIONS OR EDGES

(71) Applicant: Autodesk, Inc., San Rafael, CA (US)

(72) Inventor: Luc Franck Robert, Valbonne (FR)

(73) Assignee: AUTODESK, INC., San Rafael, CA (US)

( * ) Notice: Subject to any disclaimer, the term of this patent is extended or adjusted under 35 U.S.C. 154(b) by 1076 days.

(21) Appl. No.: 14/263,624

(22) Filed: Apr. 28, 2014

(65) Prior Publication Data

US 2015/0312550 A1 Oct. 29, 2015

(51) Int. Cl.
| H04N 13/02 | (2006.01) |
| G06K 9/52 | (2006.01) |
| G06K 9/46 | (2006.01) |
| G06T 7/00 | (2017.01) |
| G06T 7/40 | (2017.01) |
| H04N 13/204 | (2018.01) |
| G06K 9/00 | (2006.01) |
| G06T 7/13 | (2017.01) |
| H04N 13/207 | (2018.01) |
| H04N 13/271 | (2018.01) |

(52) U.S. Cl.
CPC ....... *H04N 13/204* (2018.05); *G06K 9/00201* (2013.01); *G06K 9/4638* (2013.01); *G06T 7/13* (2017.01); *H04N 13/207* (2018.05); *H04N 13/271* (2018.05); *G06T 2207/10024* (2013.01); *G06T 2207/10028* (2013.01); *G06T 2207/20221* (2013.01)

(58) Field of Classification Search
CPC . G06K 9/4638; H04N 13/0203; G06T 7/0051
USPC .......................................................... 348/46
See application file for complete search history.

(56) References Cited

U.S. PATENT DOCUMENTS

| 2002/0059042 A1* | 5/2002 | Kacyra | ................ G01B 11/002 702/152 |
| 2003/0030638 A1* | 2/2003 | Astrom | .................. G06K 9/325 345/420 |
| 2004/0027347 A1* | 2/2004 | Farsaie | ................ H04N 13/221 345/419 |
| 2007/0130239 A1* | 6/2007 | Wheeler | ............ G06K 9/00201 708/130 |

OTHER PUBLICATIONS

"Improving Harris corner selection strategy"—F. Bellavia, D. Tegolo, C. Valenti, IET Computer Vision, 2011, vol. 5, Issue 2, pp. 87-96.*

(Continued)

*Primary Examiner* — Mainul Hasan
(74) *Attorney, Agent, or Firm* — Gates & Cooper LLP

(57) ABSTRACT

A method, system, apparatus, article of manufacture, and computer program product provide the ability to detect junctions. 3D pixel image data is obtained/acquired based on 2D image data and depth data. Within a given window over the 3D pixel image data, for each of the pixels within the window, an equation for a plane passing through the pixel is determined/computed. For all of the determined planes within the given window, an intersection of all of the planes is computed. A spectrum of the intersection/matrix is analyzed. Based on the spectrum, a determination is made if the pixel at the intersection is of 3 or more surfaces, 2 surfaces, or is 1 surface.

14 Claims, 3 Drawing Sheets

(56) References Cited

OTHER PUBLICATIONS

"Improving Harris corner selection strategy"—F. Bellavia, D. Tegolo, C. Valenti, IET Computer Vision, 2011, vol. 5, Issue 2, pp. 87-96 (Year: 2011).*
Forstner, W., et al., "A Fast Operator for Detection and Precise Location of Distinct Points, Corners and Centers of Circular Features", In Proc. Intercommission Workshop of the International Society for Photogrammetry and RemoteSensing, Interlaken, Switzerland, Jun. 1987.
Harris, C., et al., "A Combined Corner and Edge Detector", In Proc. of the Fourth Alvey Vision Conference, Manchester (UK), Aug.-Sep. 1988, pp. 147-151.
"Gradient", Wikipedia, accessed Mar. 13, 2014. http://en.wikipedia.org/wiki/Gradient.
"Homogeneous Coordinates", Wikipedia, accessed Mar. 13, 2014. http://en.wikipedia.org/wiki/Homogeneous_coordinates.

* cited by examiner

COMBINING TWO-DIMENSIONAL IMAGES WITH DEPTH DATA TO DETECT JUNCTIONS OR EDGES

BACKGROUND OF THE INVENTION

1. Field of the Invention

The present invention relates generally to image data, and in particular, to a method, system, apparatus, computer program produce, and article of manufacture for combining two-dimensional (2D) images with depth images or point clouds for an accurate and robust extraction of junctions.

2. Description of the Related Art

Detecting junctions or edges in three-dimensional (3D) reality capture data is important for different applications. For example, extracting meaningful information such as the junctions of surfaces (e.g., walls, doors in a building, etc.) from a basic 3D point cloud can be used to re-create high-level computer aided design (CAD) descriptions from a point cloud. In another example, detecting junctions may be used to find specific characteristic points in several point clouds shot from different locations, and using the points to register the 3D point clouds together in space. Prior art applications fail to provide low level processing capabilities that detect edges/junctions from such data.

Different types of devices/sensors are used for different purposes—a first type of sensor may be used for color/intensity (e.g., a laser scanner that obtains point cloud data) while a second type of sensor may be used for depth (e.g., a Kinect™ sensor). Low-level processing modules (i.e., modules that examine small windows/parts of the data) are used to extract/determine information/data from color/intensity data and depth data. For example, low-level processing modules may be used to extract/determine edges/corners in images. Similarly, low-level processing modules may be used to extract/determine information in depth data.

While images that provide color/intensity data may be useful at showing where edges/transitions occur (e.g., one can see the edges in mages), such images are poor at perceiving depth (especially at edges). For example, a laser may cast a ray on a surface and examine what is returned to the laser device. Unfortunately, many discontinuities are returned wherein one part of the ray may hit a near surface while another part of the ray hits a far surface. If there is a sharp angle on the surface and both faces of the surface are visible, the different directions of the surface may impact the ray in different ways resulting in a returned signal that is unreliable or inaccurate. Similarly, depth based sensors capture depth with a sparse resolution or a resolution that is not as dense as that obtained with color/intensity based scanners (e.g., that acquire RGB [red, green, blue] pixel data).

In a CAD environment, accuracy is of the utmost important. For example, users may desire to model beam structures and capture edges of structures (e.g., doors, windows, and walls). Edge measurements provide the accurate position of the beam elements. However, most CAD users rely on laser scanners. While laser scanners may capture flat surfaces and planes well, edges are not easily determinable/captured. To obtain edges, most prior art systems intersect planes. However, the sampling of laser points will not find points on an edge but points close to an edge (e.g., on one side or the other) thereby requiring a user to examine neighboring points to locate an edge. Such an examination is expensive in terms of time and processing and is also inaccurate.

A light camera/scanner may be able to obtain additional information (e.g., higher resolution data) where a depth based scanner is lacking in quality. Pictures and photographs may be used to gather light for all of the surfaces (e.g., by capturing all light emitted and returned in a scanner/camera). With a light laser scanner, the sampling may be sparse with points that are very disjointed. However, there is no capability in the prior art that combines depth data from a light laser scanner with that of a color/intensity based scanner.

What is needed is the capability to combine data from a laser scanner with depth based data in order to accurately determine junctions and edges.

SUMMARY OF THE INVENTION

Embodiments of the invention combine information from one or several 2D images with information from a range image to improve the extraction of edges and corners in space, both from an accuracy and robustness standpoint.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention combine information from one or several 2D images with information from a range image (e.g., depth data) to improve the extraction of edges and corners in space, both from an accuracy and robustness perspective. One exemplary use case is that of using an RGB plus a depth sensor such as the Kinect™ sensor that produces depth data at a resolution that is lower than the resolution of an RGB image.

Hardware Environment

Figure 1:
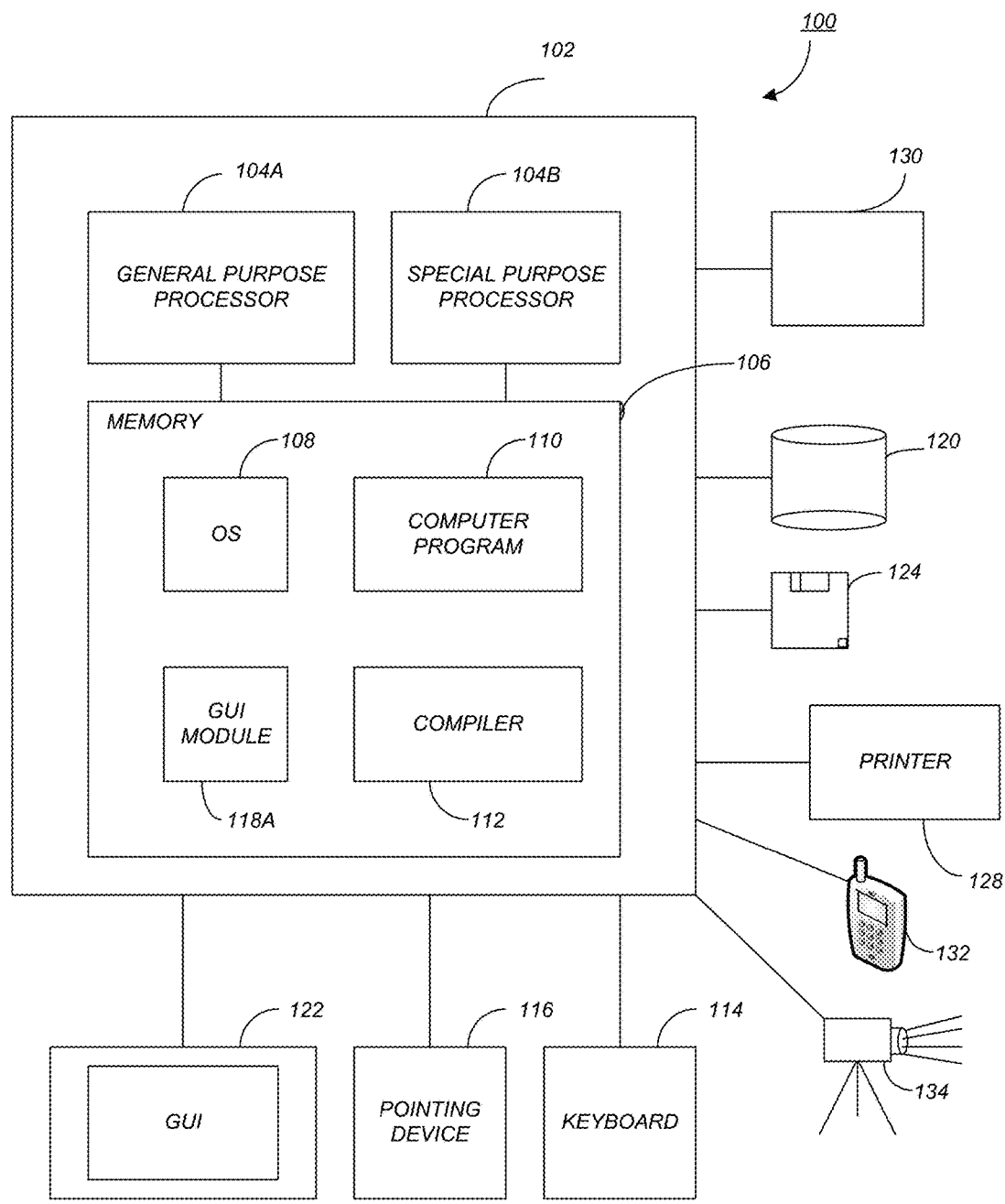
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 may be coupled to, and/or integrated with, a sensor device 134. Sensor device 134 is configured to scan an object or urban environment and obtain a digital representation of such an object/environment. The digital representation may be in the form of point cloud data (e.g., color/intensity values such as RGB data) and/or depth data (both of which may be processed by the computer 102). Sensor device 134 may be a laser scanning device, a light camera device, a depth scanner/sensor (e.g., a Kinect™ sensor), and/or any type of sensor that acquires pixel data and/or depth data. Multiple sensors 134 may also be used to provide both color/intensity data as well as depth data. Alternatively, a single sensor 134 may provide both color/intensity data as well as depth based data.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 that allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, cause the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
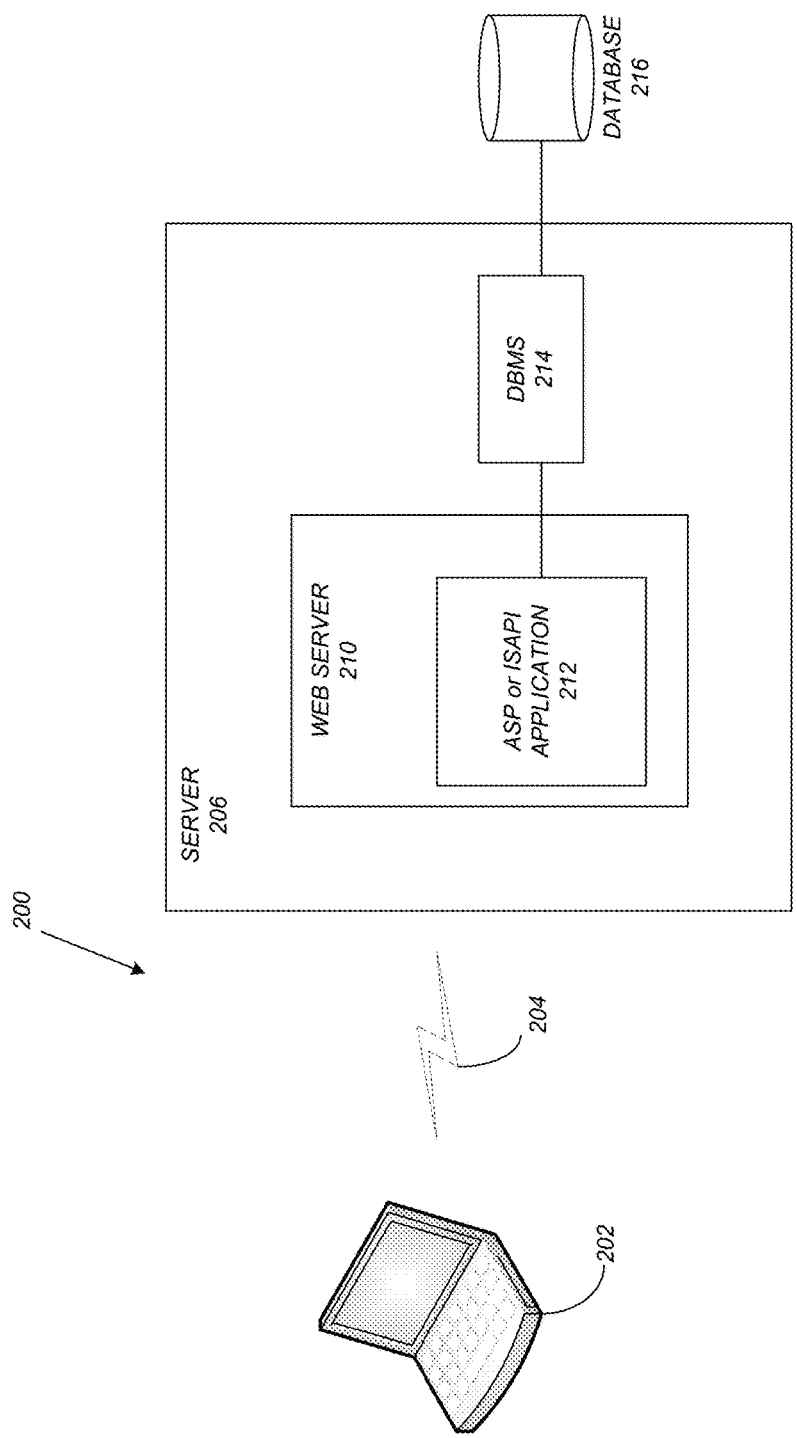
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (e.g., such as that set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 202-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102, 202, and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102, 202, and 206.

Junction/Edge Detection

Embodiments of the invention may be implemented as a software application on a client 202 or server computer 206. Further, as described above, the client 202 or server computer 206 may comprise a thin client device or a portable device that has a multi-touch-based display.

When manipulating images from a depth sensing device (e.g., laser scanner, Kinect™, etc.), depth data corresponds to a sampling of points in space. When one wants to extract higher-level information such as corners (e.g., the junction of three [3] walls), edges (e.g., the junction of two [2] walls), the information has to be deduced from the sampled point data by intersecting surfaces fitted on the sampled data in the area of the searched contour.

If one assumes that one or several "regular" images (e.g., RGB or intensity images) are attached to a depth image, and either shot from the same exact viewpoint, or shot from a distinct viewpoint registered in space with respect to the original depth sensor, one may show how the signal from these one or several images can be combined to better detect the junction(s).

The detector can be used in RGB or depth images, or both combined, and finds salient points/edges based on the analysis of eigenvectors/eigenvalues in matrices built based on 1st-order derivatives (gradient) computed in the images.

One method for detecting a junction/corner is described in Wolfgang Forstner and E. Gulch, "A Fast Operator for Detection and Precise Location of Distinct Points, Corners and Centers of Circular Features", In Proc. Intercommission Workshop of the International Society for Photogrammetry and RemoteSensing, Interlaken, Switzerland, 1987. The method finds an accurate 2D feature as the least-squares intersection of edge lines in 2D images. Looking at a window of pixels in an image pixel, a detector tells if one, and only one junction can be found within this window. Such detection is performed by computing, in the least square sense, the intersection of all lines orthogonal to image gradients within this window, at all edge pixels within the window (e.g. pixels where the gradient is locally maximal along its direction).

In other words, a window/viewport is moved over an image and all pixels within the window are examined. For each pixel, the gradient of the intensity of the image may be measured. The gradient provides the direction (e.g., the orthogonal direction) to a line passing through that pixel. An equation can be constructed for each line passing through that pixel. Equations may then be written for every pixel in the window. Alternatively, one does not need to examine all of the pixels in the window. Instead, computations may be limited to those pixels for which the gradient value is maximal along the direction of the gradient (e.g., a typical edge detection criteria). In this regard, if there is a gradient of intensity along a surface, the maximum gradient will not be reached until a large jump exists at that pixel in the line.

The intersection (in the least squared sense) of all of the lines is computed. If the window has 2-3 lines intersecting, a solution (in the least squared sense) exists (e.g., the intersection point). Thus, based on the condition of a least squared system, there may be zero (0) solutions, one (1) solution, or an infinite number of solutions. To accurately detect an edge, embodiments of the invention limit examination to cases where there is only one (1) solution (i.e., where there is only one point).

To compute the number of solutions (e.g., based on the linear equations determined as described above), one may solve a two (2) equation linear system. Solving a 2-equation linear system determines: (1) whether there is only one intersection point; and (2) what this intersection point is (with subpixel accuracy).

Instead of using 2D pixel coordinates, embodiments of the invention use 2D homogeneous coordinates. This enables the extension of a 2D approach to 3D, as well as combines 2D and 3D information.

At each point in a window, a 3×3 matrix is built that represents the sum of all 3×3 matrices to $L_{ij} \cdot L_{ij}^T$, where $L_{ij}$ is the 3-vector defining the line equation normal to the gradient at pixel ij, and T indicates matrix transposition. Through spectral analysis of this matrix, one may deduce where there is one junction/edge within the window:

- If the smallest eigenvalue is far from zero, there is no solution;
- If the smallest eigenvalue is close to zero and the second smallest is far from zero, there is a junction. The homogeneous coordinates of the junction are defined by the eigenvector corresponding to the smallest eigenvalue; and
- If both the smallest and second smallest eigenvalue are close to zero and the largest eigenvalue is non-zero, a whole line is the solution: the line joining the two points is defined by the cross product of the two eigenvectors corresponding to the two smallest eigenvalues (in homogeneous coordinates).

Determining whether eigenvalues are zero or not can be done in many different ways, e.g. by comparing them with a simple absolute threshold, comparing the ratio between two eigenvalues and comparing to a threshold (meaning one is zero and the other is not), or using a derived formula such as proposed in Harris and Stephens (1988): "A combined corner and edge detector". In Proc. Of the Fourth Alvey Vision Conference, Manchester (UK), 1988, pp. 147-151 (which is incorporated by reference herein).

If all eigenvalues are zero, there is nothing interesting to extract in this window.

The above principle can be extended to images having a depth component (e.g., RGB 3D images). Within a given window, a least-squares intersection of planes is computed by accumulating 4×4 matrices. Depending on the spectrum (i.e., the multiset of the matrix's eigenvalues) of the 4×4 symmetric matrix, one may determine if the point is at the intersection of three (3) or more surfaces, two (2) surfaces (e.g., 2 zero eigenvalues, a crease), or one (1) surface (e.g., 3 zero eigenvalues, a planar surface).

In other words, points in 3D space and planes are examined. Instead of intersecting lines in a window, at each point in the window, one considers the plane (and not lines) that is passing through the points in space. To consider such data, a 4×4 matrix is constructed that intersects all of the planes in a given window. Determining the eigenvalues for such a matrix (e.g., and the number of solutions/eignvalues) determines the number of surfaces that intersect at a point.

Combining 2D and 3D Images

In one extension to the above, 3D and 2D data are used jointly to create a composite matrix. By taking into account linear equations corresponding to the link between 2D pixel coordinates and 3D coordinates (based on the camera intrinsic parameters), pixel and depth information are combined to solve one unique least-squares system at each pixel. In a typical case, the final matrix will be 4×4, and will be the weighted sum of the 4×4 matrix built from 3D image data, and a 4×4 matrix obtained by multiplying the least squares matrix on the left and right by a 3×4 matrix corresponding to the projection relation between 3D and 2D entities.

In other words, embodiments of the invention assume that there is a projection equation that projects 3D image data onto a 2D image. Such a projection may typically be performed using a 3×4 matrix (e.g., so that there is a linear relation between 3D space represented by four (4) homogeneous coordinates and 2D space represented by three (3) homogeneous coordinates). By passing 3D image data through such a matrix, the desired result (e.g., of 3D image data projected onto a 2D image) is achieved. The equations representing the combination correspond to planes that are not necessarily on the surface of an object but are defined by the line in the 2D image plus the center of a camera (e.g., dependent upon the 3D projection matrix). These planes contain the intersection point we are looking for. The planes may also be intersected, including in the least square sense when many of them are available.

In view of the above, the following equations may be used:

(1) a 2D normal equation:

$$m^T K m = 0 \text{ (}K\text{ is a 3×3 matrix, }m\text{ is a 3-vector)};$$

(2) a 3D normal equation:

$$M^T Q M = 0 \text{ (}Q\text{ is a 4×4 matrix, }M\text{ is a 3-vector)}; \text{ and}$$

(3) a Projection equation describing a correspondence between 2D and 3D entities:

$$m = PM \text{ (}P\text{ is the 3×4 projection matrix)}$$

From equations (1) and (3), one can deduce:

$$M^T(P^T K P)M = 0$$

This equation can be combined with (2):

$$M^T(\alpha P^T K P + \beta Q)M = 0$$

where α and β are arbitrary coefficients that can control the relative weights of 2D and 3D derived equations.

By looking at the eigenvalues of that combined 4×4 matrix, junctions can be extracted in a way that combines information from both 2D and 3D images.

Combining More than Two (2) Images

With laser scans, one can combine an intensity image (reflectance from the laser signal) with an (XYZ) image (i.e., a depth image). In this regard, with laser scans providing RGB data, one can combine intensity+RGB+depth (i.e., XYZ).

An arbitrary number of 2D and 3D images can be combined this way, provided that projection matrices are known for all 2D images, as well as rotations/translations for all depth images/point clouds. This can be done, for instance, by:

- Computing at each pixel of each image the value of the Q/K matrix;
- Iterating over all pixels of depth images. For each pixel, finding its corresponding location in all images through projection, only keeping the relevant ones (i.e. do not consider images where the point is occluded);
- Accumulating all corresponding matrices; and
- Performing spectral analysis.

One particular case of 2D images can be obtained by projecting depth values from the depth image onto a 2D plane. The standard criterion described above for a 2D RGB or gray-level image can be applied to this 2D image of depth values in the same exact way, leading to the detection of junctions and edges located along depth discontinuities from that viewpoint.

By performing separate spectral analysis of the different matrices produced by looking at 2D or 3D data, one can even infer more information on the detected features, for instance:

The feature is detected as such both in the 2D image and the 3D data: it is a salient corner of an object.

The feature is detected as such only in the 2D image, but not in the 3D data: it is due to a texture marking on a regular surface.

Efficient Computation

Efficient schemes used in 2D image separable filtering can be applied to further enhance the junction determination of embodiments of the invention.

Box Filter

Typically, a box filter is basically an average-of-surrounding-pixel type of filtering. Traditionally, a box filter is a commonly used mathematical operation for image filtering where an image sample and a filter kernel (e.g., a 3×3 filter kernel/matrix) are multiplied to provide a filtering result. In embodiments of the invention, the 3×3 (in 2D) or 4×4 (in 3D) matrix/filtering kernel may be built in a scanline manner. A new line/column of data is added and an old one line/column of data is subtracted. One buffer of W values is needed to store matrices corresponding to one pixel contribution, and one buffer of H×Iw values is needed to store horizontal sums (W and H are window sizes. Iw×Ih are depth image sizes).

Box filtering may include the sum of w adjacent values. Each time a window is moved one pixel to the right along the horizontal line, the value at the new considered pixel is added to the horizontal sum, and the value of the pixel located w to the left (stored in the horizontal buffer of w values) is subtracted. The new value is stored in the buffer, in place of the value that was just subtracted. Therefore, with one addition and one subtraction, the horizontal sum of w adjacent pixels (w-sums) is computed at a given position, based on the value of the sum at the previous horizontal position.

The same principle may be applied vertically, to keep track of the sum of all pixel values within the sliding w*h window. For this, a buffer is needed to store all w-sums, at all pixels of the previous h lines, so that it is possible to add at the current vertical position the current w-sum (computed as described above), retrieve from the buffer, and subtract the horizontal w-sum computed h lines before at the same horizontal position. The w-sum that was just added is stored in the buffer in place of the one that was just subtracted. The result is the sum of all image values in the w*h window at the current position.

Matrix Images

By building 2D images of matrices (at each pixel, pixel value is the contribution to a 3×3 or 4×4 matrix) standard separable filtering schemes may be used. By using specific smoothing kernels, one can give more importance to some pixels than others.

Detecting Spheres and Cylinders

Forstner and Gulch described that by intersecting (in the least square sense) lines that are aligned with the gradient vector at each pixel (instead of being orthogonal to the gradient), one can extract circles in the image. Extending such a concept to 3D, one can intersect (in the least square sense) all lines along the estimated plane normal at each 3D point within the window. This can be done, for each point, by accumulating two plane equations (2 planes that are orthogonal to the tangent plane and passing through the considered point) instead of one.

If there is only one null eigenvalue: there is a 3D sphere, and the corresponding eigenvector is the center of the sphere;

If there are two null eigenvalues: there is a 3D cylinder, and the 2 corresponding eigenvectors are 2 points along the axis of the cylinder.

Logical Flow

Figure 3:
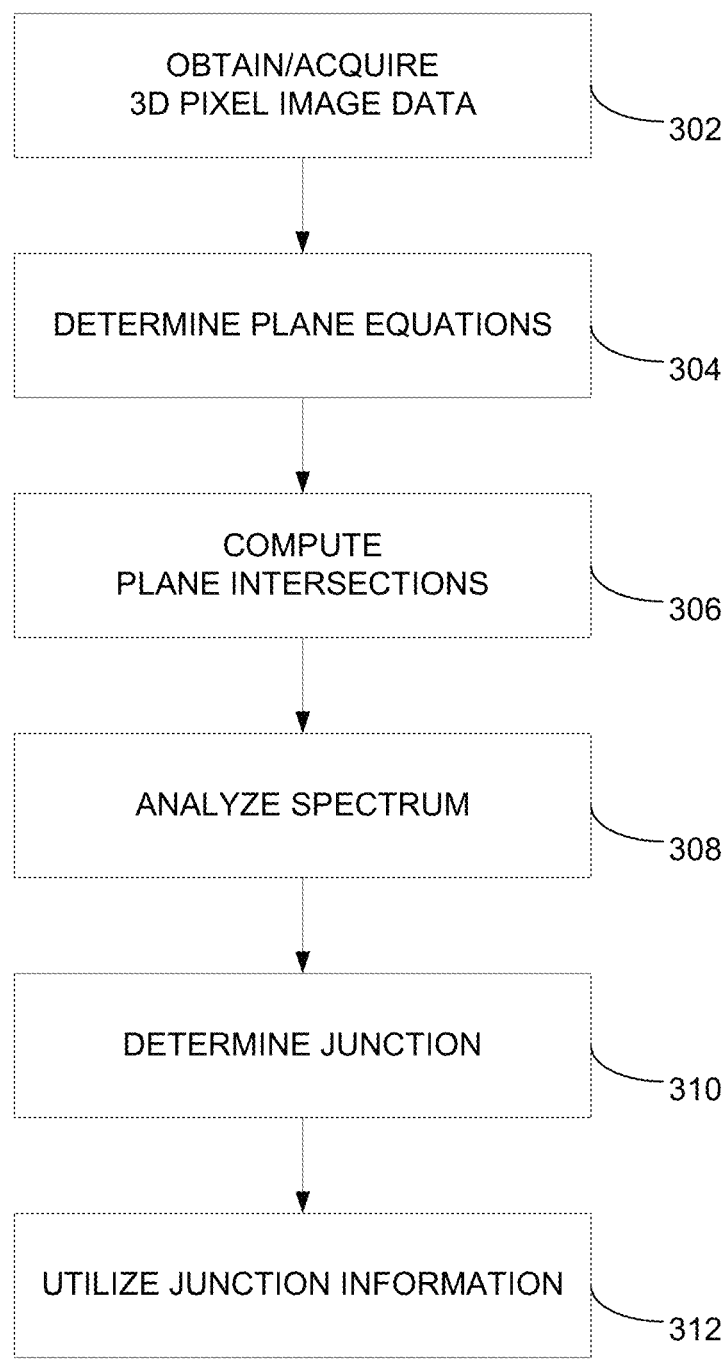
FIG. 3 illustrates the logical flow for detecting junctions in accordance with one or more embodiments of the invention.

FIG. 3 illustrates the logical flow for detecting a feature (e.g., a salient feature such a junction and/or a line in 3D space) in accordance with one or more embodiments of the invention.

At step 302, 3D pixel image data is obtained/acquired based on 2D image data (e.g., color/intensity data, point cloud data, etc.) and depth data for the 2D image data. To obtain the 3D pixel image data, depth data may be projected onto 2D image data by multiplying a 3×3 matrix (representing 2D normal equations for the 2D image data) by a 3×4 matrix (representing a projection relation between the 2D image data and the depth data).

At step 304, within a given window over the 3D pixel image data, for each of the pixels within the given window, an equation for a plane passing through the pixel is determined. The plane may be based on an orthogonal direction of an image gradient at the pixel. Equations may not be computed for all of the pixels within the window. Instead, equations may only be calculated for those pixels for which a gradient value along the image gradient is maximal (i.e., edge pixels).

At step 306, for all of the determined planes within the window, the intersections (e.g., least squares intersection), if any, of the planes are computed (e.g., using a 4×4 matrix).

At step 308, the spectrum of the intersections/matrix is analyzed. In other words, the multiset of a matrix's eigenvalues is analyzed (e.g., the eigenvalues and eigenvectors of a 4×4 matrix that represents all cumulated intersections are analyzed).

At step 310, based on the spectrum, a determination is made regarding whether the pixel is at the intersection of three (3) or more surfaces, two (2) surfaces, or is a single surface. If there are two (2) zero eigenvalues, it is determined that the pixel is at a crease (i.e., the intersection of two (2) surfaces). If there are three (3) zero eigenvalues, the pixel is at one (e.g., planar) surface. If there is one and only one zero eigenvalue, the pixel is at the intersection of three (3) or more surfaces (i.e., a corner).

At step 312, the junction information is utilized. For example, a CAD drawing that accurately depicts the junction information may be created and/or displayed (e.g., the junctions may be used to model beam structures, or other entities/objects [e.g., a bridge, a room, structural elements, etc.] within a CAD drawing). Alternatively, or in addition, alterations to the junctions may be performed within a CAD drawing and then performed on the physical junction in the real world.

In view of the above, 3D information is obtained by intersecting a number of 3D planes, some directly come from the 3D data from a scan or RGBD image, others come from the 2D image and are defined by an image contour and a camera optical center. The spectral analysis of a 4×4 matrix representing the least-squares intersection of all of these planes determines if there is a salient point in space, a line, etc.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to accurately extract/determine junctions from 2D images with depth data (e.g., or point clouds). Such a mechanism of combining 2D image and depth information not only allows one to detect salient features and characterize them (e.g., corner, edge, surface marking vs. crease on the 3D surface, etc.) but also to use all of the available data for maximal accuracy of the detected features.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for detecting a feature in three-dimensional (3D) space, comprising:
    obtaining three-dimensional (3D) pixel image data based on two-dimensional (2D) image data and depth data for the 2D image data;
    within a given window over the 3D pixel image data, for each of one or more pixels within the given window, determining an equation for a plane passing through the pixel;
    computing, for all of the determined planes within the given window, an intersection of all of the planes;
    analyzing a spectrum of the intersection;
    based on the spectrum, determining eigenvalues that determine a number of surfaces that intersect at the pixel wherein:
        one and only one zero eigenvalue corresponds to a junction of three (3) or more surfaces;
        two (2) zero eigenvalues correspond to a crease at the intersection of two (2) surfaces; and
        three (3) zero eigenvalues correspond to one (1) planar surface; and
    creating and displaying a computer-aided design (CAD) drawing that depicts the number of surfaces that intersect at the pixel.

2. The computer-implemented method of claim 1, wherein the image data comprises color or intensity data.

3. The computer-implemented method of claim 1, wherein the image data comprises point cloud data.

4. The computer-implemented method of claim 1, wherein the 3D pixel image data is obtained by:
    multiplying a 3×3 matrix representing 2D normal equations for the 2D image data by a 3×4 matrix representing a projection relation between the 2D image data and the depth data.

5. The computer-implemented method of claim 1, wherein the one or more pixels within the given window comprise those pixels for which a gradient value along an image gradient is maximal.

6. The computer-implemented method of claim 1, wherein the intersection comprises a least squares intersection.

7. The computer-implemented method of claim 1, wherein the intersection is computed using a 4×4 matrix.

8. A computer-implemented system for detecting a feature in a computer system comprising:
    (a) a computer having a processor;
    (b) an image acquiring device, communicatively coupled to the computer, that acquires three-dimensional (3D) pixel image data based on two-dimensional (2D) image data and depth data, from an depth sensing device, for the 2D image data;
    (c) an application, executing on the computer, wherein the application is configured to:
        (1) within a given window over the 3D pixel image data, for each of one or more pixels within the given window, determine an equation for a plane passing through the pixel;
        (2) compute, for all of the determined planes within the given window, an intersection of all of the planes;
        (3) analyzing a spectrum of the intersection;
        (4) based on the spectrum, determining eigenvalues that determine a number of surfaces that intersect at the pixel wherein:
            (i) one and only one zero eigenvalue corresponds to a junction of three (3) or more surfaces;
            (ii) two (2) zero eigenvalues correspond to a crease at the intersection of two (2) surfaces; and
            (iii) three (3) zero eigenvalues correspond to one (1) planar surface; and
        (5) creating and displaying a computer-aided design (CAD) drawing that depicts the number of surfaces that intersect at the pixel.

9. The computer-implemented system of claim 8, wherein the image data comprises color or intensity data.

10. The computer-implemented system of claim 8, wherein the image data comprises point cloud data.

11. The computer-implemented system of claim 8, wherein the image acquiring device is configured to acquire the 3D pixel image data by:
    multiplying a 3×3 matrix representing 2D normal equations for the 2D image data by a 3×4 matrix representing a projection relation between the 2D image data and the depth data.

12. The computer-implemented system of claim 8, wherein the one or more pixels within the given window comprise those pixels for which a gradient value along an image gradient is maximal.

13. The computer-implemented system of claim 8, wherein the intersection comprises a least squares intersection.

14. The computer-implemented system of claim 8, wherein the intersection is computed using a 4×4 matrix.

* * * * *